UNITED STATES PATENT OFFICE.

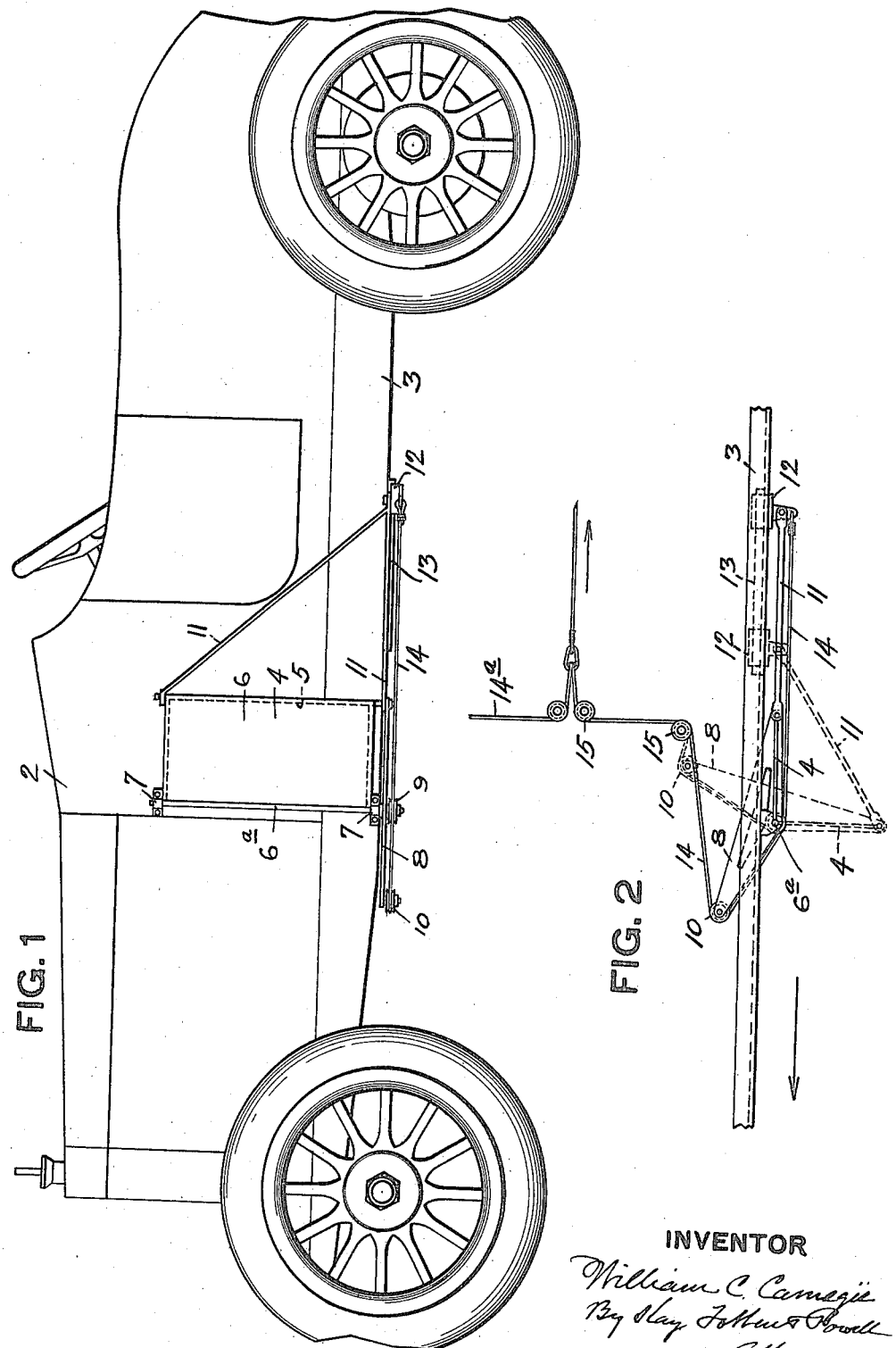

WILLIAM C. CARNEGIE, OF PITTSBURGH, PENNSYLVANIA.

AIR-RESISTANCE SPEED-CONTROL DEVICE FOR AUTOMOBILES.

1,236,263. Specification of Letters Patent. Patented Aug. 7, 1917.

Application filed February 19, 1917. Serial No. 149,520.

*To all whom it may concern:*

Be it known that I, WILLIAM C. CARNEGIE, a citizen of the United States, and resident of Pittsburgh, in the county of Allegheny and State of Pennsylvania, have invented a new and useful Improvement in Air-Resistance Speed-Control Devices for Automobiles; and I do hereby declare the following to be a full, clear, and exact description thereof.

My invention relates to air-resistance speed control devices for automobiles.

The invention is devised particularly, though not exclusively, for use with automobiles in racing.

In driving cars at high speed, and especially in road racing and on curved tracks, the necessary slackening of speed at the turns to avoid upsetting requires great skill in the operation of the car, involving throttling of the motive power and application of brakes, with resultant loss in racing time for reëstablishing the motor's speed, and often in loss and injury by wrecking of the car due to the burning out of the brake lining when the brakes are applied. Also difficulties are experienced in stopping the car in ordinary driving if the brake mechanism fails to hold and the motor control is defective, as it is perfectly obvious, under such conditions, the car will continue to move until the momentum is spent, or the car steered into an obstruction.

The object of my invention is to obviate these difficulties by providing means for controlling the speed of the moving car, which acts independently of the usual speed control means of the motive power, and of the brake mechanism, and which may be operated conjointly with the brake mechanism for effecting a quick stop of the car.

With these ends in view, the invention consists, generally stated, in employment of air-resistance members, as additional air-resisting surface to the automobile, and means for operating these members so as to move them against the resisting air for operative position, preferably, laterally of the car.

In the accompanying drawing, Figure 1 is a side elevation of an automobile with my invention applied thereto, the view showing only one-half of the complete resistance device, the other half being a like structure, arranged in like manner on the opposite side of the machine, and both adapted to operate in unison; Fig. 2 is a plan view of the device for one side of the car only, with the body of the vehicle removed from the underframe to permit clear detail of parts.

The numeral 2 indicates the body portion of an automobile mounted on the underframe 3.

The air-resistance control device comprises a pair of winglike members 4, one member arranged at each side of the car, slightly forward of the center, and in front of the side doors. These members are rectangular frames 5, covered by any suitable material 6, such as strong fabric or sheet metal. The members are hinged to the car and to the underframe, as at 7, and are adapted to lie close to the side of the car when in non-operative position, as shown in full lines in both views of the drawing, and are arranged to be swung on their hinges outwardly and forwardly to operative position, as shown in dotted lines, Fig. 2. Means for swinging the members comprise a lever 8 fulcrumed to an extension of the member centrally of the hinge center, and preferably, as shown, secured directly to the hinge-pin. This hinge-pin extends beneath the lever and forms a journal for a pulley 9. One end of the lever has the pulley 10, and the opposite end of the lever is connected to the lower edge of the hinged wing. Braces 11 are pivotally connected to the top and bottom of the wing at its free edge, and connect by pivot to a block or shoe 12, which is slidable on a guide plate 13 fast on the car underframe.

These braces form a lever connection with the wing, and act with the lever 8 to swing the wing outwardly from the car, and brace the wing in resisting position. The shoe, to which the braces are pivoted, is connected to an operating cable 14. The cable passes over pulleys 9 and 10 on the lever 8, and passes around sheaves or pulleys 15 to suitable operating mechanism, or a lever (not shown) which is controlled by the driver.

The wing on the opposite side of the car has like lever and brace connections, and is operated by a cable 14ª connected to the operating mechanism.

By the above arranged connections of lever and braces with the wing member, and the brace connection with the sliding shoe, it will be seen that pulling on the cable in the direction indicated by the arrow will cause the lever to move on its fulcrum and swing the wing member on its hinges outwardly, while at the same time the cable which is free to move over the pulleys on the lever, will, by reason of its connection to the shoe, create a pulling force which is applied by the connecting braces to the free edge of the wing, the force so applied by the braces relieving to a great extent the twisting strain applied to the wing hinge-pin by lever 8. The braces as they are drawn forward by the cable form toggle-like levers of great power and move the wing against the resisting air, and also provide rigid supports for the extended wing in operative or resisting position, for any position of its movement to or from the car.

The above described arrangement of levers and cable provides for quick extension of the wing to resisting position with but little labor by the operator, and it will be seen that by mounting the wings so as to move in the direction in which the car is moving and against the air for operative position, the resisting air will act to return the wings to non-operative position upon release of the holding cable.

The arrangement permits of positive slackening of the car's speed by adding resisting surface to the moving car. The wings may be rapidly vibrated, and when so operated, each vibration of the wings may be made a maximum resisting position; and when applied rapidly in succession, effects a quick stopping of the car.

It will be apparent that changes may be made in the structure of levers and their connections to parts without departing from my invention; and I do not wish to limit my invention to the exact structure shown and described.

What I claim is:

1. In speed-control devices for automobiles or like vehicles, the combination with the vehicle body, of air-resisting members, means for swinging the members forwardly to resisting position laterally of the body, and means for bracing the free ends of the members in resisting position from the rear.

2. In speed-control devices for automobiles or like vehicles, the combination with the vehicle body, of air-resisting members pivoted to the body, means for swinging the members forward to lateral resisting position, and means coöperatively associated with said swinging means for bracing the members in operative resisting position from the rear.

3. In speed-control devices for automobiles or like vehicles, the combination with the vehicle body, of air-resisting members pivoted to the body, means for swinging the members forward to lateral resisting position, and supplemental means simultaneously operative with said first swinging means for bracing the members in resisting position from the rear.

4. In speed-control devices for automobiles or like vehicles, the combination with the vehicle body, of air-resisting members comprising wings hinged to the body of the vehicle and adapted to swing forwardly to resisting position laterally of the body, means for initially swinging the wings, and supplemental swinging means connected to the wing co-acting with said first means for bracing the wings in operative resisting position from the rear.

5. In speed-control devices for automobiles or like vehicles, the combination with the vehicle body, of air-resisting wings hinged to the body, and adapted to swing forwardly to resisting position laterally of the body, means for swinging the wings comprising an operating cable, connections between the wing and the cable for swinging the wings, and connections between the wings and cable for bracing the wing from the rear.

6. In speed-control devices for automobiles or like vehicles, the combination with the vehicle body, of air-resisting wings hinged to the body and adapted to be swung forward to resisting position, an operating cable, a lever connected to the wing to swing the wing on its hinges, braces connected to the outer rear edge of the wing and having their opposite ends slidably connected to the vehicle body, said lever and braces connected to said cable for simultaneous movement.

7. In speed-control devices for automobiles or like vehicles, the combination with the vehicle body, of air-resisting wings hinged to the body and adapted to be swung forward to resisting position, an operating cable, a lever connected to the wing for swinging the wing, braces pivoted to the free edge of the wing, a shoe connected to the opposite end of the braces, a guide for the shoe, said cable connected to said lever and to said shoe for simultaneously swinging the lever, and moving the shoe to swing and support the wing in resisting position.

In testimony whereof, I the said WILLIAM C. CARNEGIE, have hereunto set my hand.

WILLIAM C. CARNEGIE.

Witnesses:
JOHN F. WILL,
JOHN R. KELLER.